Nov. 13, 1962

L. S. BOHL ETAL 3,063,656

PLASTIC CYLINDER BALLOON

Filed Nov. 30, 1954

INVENTORS:
LELAND S. BOHL
CHARLES L. CRITCHFIELD
WILLIAM F. HUCH
EDWARD P. NEY
JOHN R. WINCKLER

BY

ATT'YS

INVENTORS:
LELAND S. BOHL
CHARLES L. CRITCHFIELD
WILLIAM F. HUCH
EDWARD P. NEY
JOHN R. WINCKLER
BY

ATT'YS

United States Patent Office 3,063,656
Patented Nov. 13, 1962

3,063,656
PLASTIC CYLINDER BALLOON
Leland S. Bohl and Charles L. Critchfield, Minneapolis, William F. Huch, St. Paul, Edward P. Ney, Minneapolis, and John R. Winckler, St. Paul, Minn., assignors, by mesne assignments, to the United States of America as represented by the Secretary of the Navy
Filed Nov. 30, 1954, Ser. No. 472,266
4 Claims. (Cl. 244—31)

This invention relates in general to a tapeless cylindrical balloon in which the gores are similar straight sections or are slightly modified between parallel ends to provide a compromise construction, and is more particularly described as a natural shape balloon used in connection with a duct appendix of the proper length, having a constant material or cross section stressed most efficiently, uniaxially and equally, eliminating the need for reinforcing tapes.

An important object of the invention is to provide a simple basic design which simplifies manufacturing by eliminating special jigs and patterns for various balloon sizes, the cutting and sealing of curved edges, and the application of reinforcing tapes which has the further advantage of removing a major contribution to the superheat of the balloon gas in comparison with the contribution of the plastic skin of the balloon.

Other objects of the invention will appear in the specification and will be apparent from the accompanying drawings in which FIG. 1 shows a single rectangular gore of plastic material from which a balloon in accordance with this invention is constructed;

As heretofore made, the balloon gores have been shaped from top to bottom to produce a so-called natural shape balloon rounded at the top and bulging outwardly therefrom with a gradually reduced lower section tapered to provide an opening or an appendix at the base of the balloon. A light-weight envelope of thin plastic material, such as polyethylene, which contains fluid of different and lighter density than the outside air, will tend to form certain natural shapes with certain envelope conditions. For envelopes stressed only in the longitudinal direction, or with unlimited lateral freedom, the shapes with different length to volume ratios will appear in the conventional form as described above with a large rounded top and a decreasing and converging bottom, depending on the payload carried.

In a balloon with lateral material freedom, the tendency will also be to form the same or similar shapes. Because of this lateral freedom, the lateral stresses in the material approach zero and consequently the material is stressed only in the longitudinal direction. This has been found to be the most desirable manner in which to stress plastic sheeting.

Constant volume balloon shapes are ordinarily obtained in the manufacture by patterning the sections or gores to result in a desired shape, such as a conventional balloon in which each gore is wide at an intermediate part thereof and is tapered or narrowed at the ends. The cross section of the material, and also the strength, are thus veined along the gore. To carry the load, reinforcing tapes are applied in the longitudinal direction. It has been found that such tapes, as currently used, contribute considerably to the superheat of the balloon gas in comparison with the contribution of the plastic skin of the balloon. Superheat is undesirable as it affects the lift of the balloon, the change from day to night, resulting in a descent or the requirement of ballast expenditure to stay aloft.

In the present invention, the basic structure is a cylindrical tube in which the top and bottom edges are gathered. This provides a constant cross section of material which enables the entire film to be stressed equally as well as uniaxially, one of the features of this invention. Another feature is the decrease in the superheat due to the absence of the tapes which are no longer required. Other inherent features of the cylinder design are the simplified and more flexible manufacture of various sized cylinders having straight seams and no reinforcing tapes.

A free balloon leaves the ground at a fraction of its full volume; as it rises, the gas expands with the decrease in atmospheric pressure; and when it starts to rise above the desired ceiling altitude, it must valve the excess free lift gas which causes it to rise. This is normally accomplished by a valve or appendix at the base of the balloon or by a duct appendix extending from the top as herein shown.

Figure 1:
Figure 2:
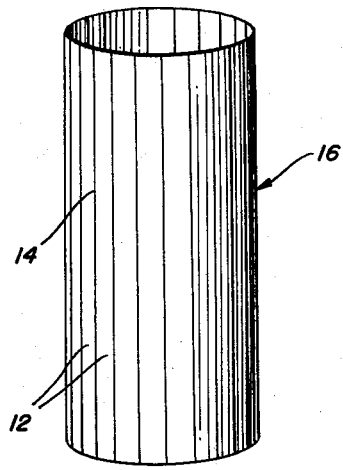
FIG. 2 is a perspective view of a cylindrical envelope made of a plurality of uniform gores as shown in FIG. 1.
Figure 3:
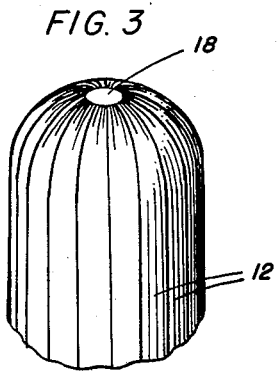
FIG. 3 illustrates one end of a balloon as shown in FIG. 2 having the gores gathered or pleated and connected by an end plate.

Referring now more particularly to the drawings, a plurality of single rectangular gores 12 of polyethylene material of desired length is secured together by welded joints 14 at the edges connecting them with the adjacent gores to form a cylindrical envelope 16 as shown in FIG. 2. To close the upper end as shown in FIG. 3, the gores may be pleated and gathered, and tightly confined to an end plate 18 or between similar end plates at the inside and outside of the balloon tightly binding the ends of the gores in place.

Figure 5:
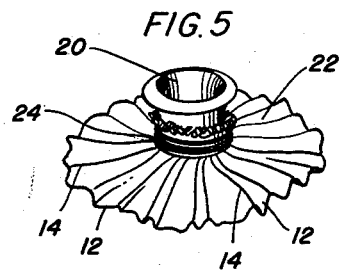
FIG. 5 is a perspective view and FIG. 6 is a sectional view thereof showing the method of gathering the ends of a balloon of this cylindrical type and securing them to a supporting hollow thimble.
Figure 6:
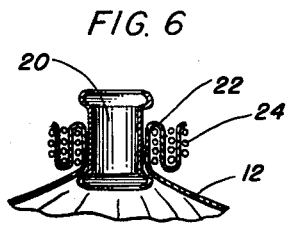

Instead of closing the upper end, a light-weight metal thimble 20 (FIGS. 5 and 6) of aluminum or other lightweight metal or material may have the ends of the gores gathered and confined about the thimble in folds 22 which are tightly secured thereto by cords 24 or other wrapping. This thimble may be closed at the inner and outer ends by suitable closures or one end of a duct appendix 26 may be connected thereto in any suitable manner. The duct appendix extends downwardly at the side of the balloon to which it may be connected by suitable ties 28 (FIG. 4) at intervals leaving the lower end open as hereafter described.

Figure 8:
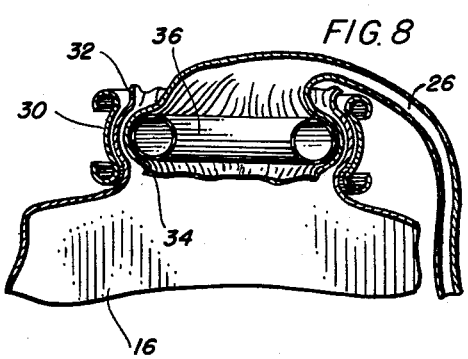
FIG. 8 is a sectional view of an attachment ring as shown in FIG. 7 to which a duct appendix is also connected.

A preferred connection for the upper end of the balloon is shown in FIG. 8 and comprises a light and strong ring 30 of aluminum, plastic, or other suitable material through which the upper folded and gathered ends 32 of the gores are inserted. The upper and inwardly turned extremity 34 of a duct appendix 28 is inserted from the outside, at the inside of the balloon gores. An inflatable tube 36, like an automobile tire inner tube, is inserted at the inside of the gore ends 32 and the inner end of the duct appendix. The tube may be inflated to a sufficient degree to tightly press and hold the said extremities within the ring 30 which is curved outwardly in cross section as shown in FIG. 8 to seat the pneumatic tube and the extremities therein and to seal them against the escape of the balloon gas. The tube 36 is open at the center for a free passage of gas from the balloon to the duct appendix.

Figure 7:
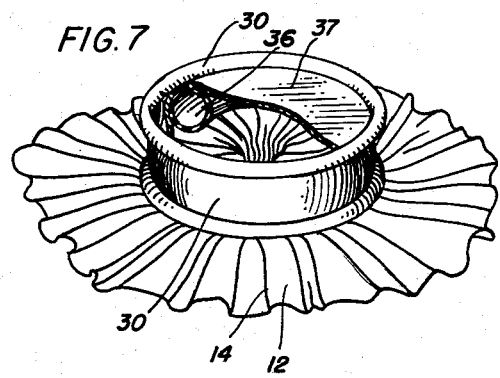
FIG. 7 illustrates the attachment of the connected end of a balloon at the inside of an end attachment ring.

The lower end of a balloon may be similarly sealed by means of an attachment ring 30, and, to close this end of the balloon, a diaphragm 37 (FIG. 7) of flexible material extending over the pneumatic tube 36 may be sealed in place around the tube as shown in FIG. 8, the diaphragm (as in FIG. 7) closing the opening.

Figure 4:
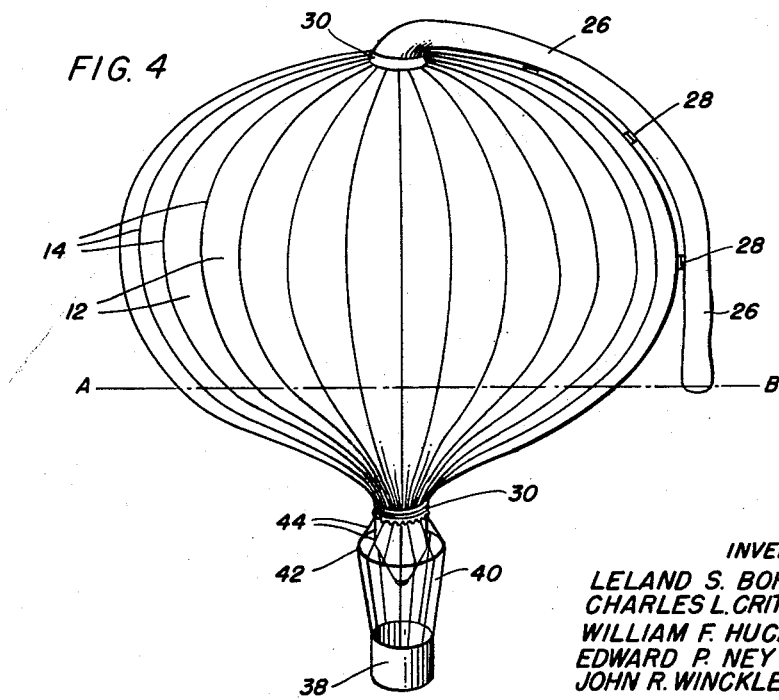
FIG. 4 is the perspective view of a cylindrical balloon with the ends gathered inwardly and inflated to a flattened onion shape, a duct appendix connected at the top and a load supported at the lower connected end.

For a load balloon gathered at the ends and inflated as shown in FIG. 4, a weight or load 38 may be suspended by wires or cables 40 connected to a load ring 42 which in turn is supported by wires or cables 44 from the lower attachment ring 30. When at ceiling altitude, the ends of this balloon become flattened, and the central zone appears to bulge, producing a flattened spheroid or an approximately onion shape.

Figure 9:
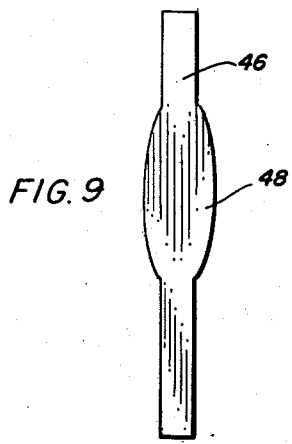
FIG. 9 is an individual gore which forms an element of a compromise cylindrical balloon construction as shown in FIG. 10.
Figure 10:
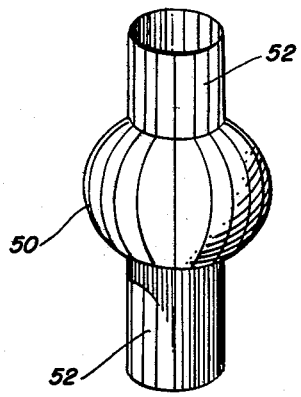

Certain features and principles of this invention may be applied to balloons of a comprise design as shown in FIGS. 9 and 10 in which each gore 46, although of uniform width at the extremities, has an intermediate outwardly rounded portion 48 which forms an outwardly rounded or bulbous portion 50 between reduced cylindrical ends 52 when the gores are welded together. In this example, the gores may be small compared to the weight, size, or strength. The balloon material, although as thin as it is practical to use, is not greatly stressed. Cylinders smaller than the maximum desired balloon diameter would thus be of adequate strength. The overall design for these conditions would consist of a portion larger in diameter than the small cylinder which is patterned in the ordinary manner. From the ends of the gores the constant small cylinder diameter would be maintained. The ends of the small cylinder gathered and used in the same manner as described for the complete cylinder balloons would provide certain advantages as before, namely, decrease in superheat and simplified manufacture without the application of connecting tapes. There would be the further advantage of lower balloon weight and higher ceiling altitude as compared with the taped balloon and the natural shape cylinder balloon. The shaped portion of this balloon would not necessarily be restricted to the so-called natural shape.

To achieve the desired natural shape, round at the top and tapered at the bottom, free valving must take place substantially at zero pressure level as indicated by the line A—B, FIG. 4. This is easily possible with a duct appendix 26 which is maintained open at the lower end. Above the zero pressure level, the gas of the balloon and in the appendix will be under pressure; and at the zero level, the pressure will be substantially the same as the outside pressure. Below the zero level in the balloon, there may even be a slight negative pressure. The relationships which must be maintained between balloon volume, cylinder dimensions, and valving for zero pressure position may readily be observed and determined. Only in the special case where the zero pressure level coincides with the base of the balloon would a simple appendix check valve perform properly.

It is recognized that in the past, sections of tubes or cylinders have been inflated and flown as balloons. However, these have been inflated to assume cylindrical shapes or pillow shapes; they were not made of separate gores secured together and are not uniaxially stressed natural shapes and are not considered within the scope of this invention.

While we have described the preferred embodiment and some variations of this invention, it should be regarded as an example or embodiment of the invention and not as a restriction or limitation therein as many changes may be made in the construction and arrangement of the parts without departing from the spirit and scope of the invention.

We claim:

1. In a high altitude balloon construction, a non-extensible polyester film envelope having a circumferentially pleated zone extending a substantial distance from the top to the equator of the envelope, and a duct communicating at one end with the top of the interior of the envelope and extending downward outside of the envelope and having an open lower end adjacent and above the bottom of the envelope to limit ascent of the envelope to a ceiling altitude at which the envelope is distended to less than full volume, the envelope being closed except for its communication with the duct.

2. In a high altitude free balloon construction, a non-extensible polyester film envelope having two pleated zones extending respectively a substantial distance from the top and bottom outward toward the equator of the envelope, the envelope being formed of elongated strips extending from top to bottom of the envelope and sealed together at their longitudinal margins in a circumferential series, the portions of the strips forming the zones being rectangular.

3. In a high altitude free balloon construction, a non-extensible polyester film envelope having two pleated zones extending respectively a substantial distance from the top and bottom outward toward the equator of the envelope, the envelope being formed of a nominally right cylindrical tube consisting of rectangular strips extending from top to bottom of the tube and sealed marginally in a circumferential series with the margins nominally parallel to the tube axis.

4. In a high altitude free balloon construction, a non-extensible polyester film envelope having two pleated zones extending respectively a substantial distance from the top and bottom outward toward the equator of the envelope, the envelope comprising a tube consisting of longitudinally veined rectangular strips integrally united at their longitudinal margins in a circumferential series, each strip extending from end to end of the tube and nominally parallel to the tube axis.

References Cited in the file of this patent

UNITED STATES PATENTS

| | | |
|---|---|---|
| 655,688 | Coleman | Aug. 14, 1900 |
| 1,290,979 | Griffith | Jan. 14, 1919 |
| 2,329,490 | Smith | Sept. 14, 1943 |
| 2,338,504 | Foster | Jan. 4, 1944 |
| 2,410,786 | Mallory | Nov. 5, 1946 |
| 2,492,800 | Isom | Dec. 27, 1949 |
| 2,526,719 | Winzen | Oct. 24, 1950 |

FOREIGN PATENTS

| | | |
|---|---|---|
| 290,716 | Great Britain | May 16, 1928 |
| 873,944 | France | Apr. 13, 1942 |